US012645808B2

(12) United States Patent
Zhang et al.

(10) Patent No.: US 12,645,808 B2
(45) Date of Patent: Jun. 2, 2026

(54) ENHANCED RAW DATA SECURITY

(71) Applicants:Lemon Inc., Grand Caymon (KY); Beijing Zitiao Network Technology Co., Ltd., Beijing (CN)

(72) Inventors: Wanrong Zhang, Culver City, CA (US); Bo Jiang, Culver City, CA (US); Donghang Lu, Culver City, CA (US); Jian Du, Culver City, CA (US); Qiang Yan, Beijing (CN)

( * ) Notice: Subject to any disclaimer, the term of this patent is extended or adjusted under 35 U.S.C. 154(b) by 90 days.

(21) Appl. No.: 18/812,030

(22) Filed: Aug. 22, 2024

(65) Prior Publication Data

US 2026/0057080 A1 Feb. 26, 2026

(51) Int. Cl.
*G06F 21/60* (2013.01)
*G06F 21/62* (2013.01)

(52) U.S. Cl.
CPC ........ *G06F 21/602* (2013.01); *G06F 21/6245* (2013.01)

(58) Field of Classification Search
CPC ............................ G06F 21/602; G06F 21/6245
See application file for complete search history.

(56) References Cited

U.S. PATENT DOCUMENTS

2005/0256742 A1* 11/2005 Kohan ................ G06F 21/6254
705/2
2008/0184027 A1 7/2008 Kumar et al.

2011/0179011 A1* 7/2011 Cardno ................ H04L 9/0822
707/E17.108
2014/0237255 A1* 8/2014 Martin .................... G06F 21/10
713/182
2017/0250798 A1* 8/2017 Enga ...................... H04L 9/0643
2018/0330052 A1* 11/2018 Barrus ................ G06F 21/6254
2019/0130004 A1* 5/2019 Singh .................... G06F 16/283
(Continued)

FOREIGN PATENT DOCUMENTS

AU 2021106216 A4 11/2021
CN 115994170 A * 4/2023
(Continued)

OTHER PUBLICATIONS

Apple.com [online], "Learning with privacy at scale," Dec. 2017, retrieved on Aug. 5, 2024, retrieved from URL<https://machinelearning. apple.com/2017/12/06/learning-with-privacy-at-scale.html>, 9 pages.
(Continued)

*Primary Examiner* — Sher A Khan
(74) *Attorney, Agent, or Firm* — Fish & Richardson P.C.

(57) ABSTRACT

Methods, systems, and apparatus, including computer programs encoded on computer storage media, for processing encrypted and hashed versions of raw data. One of the methods includes receiving, by a system, a message that comprises an encrypted version of raw data and a hash of the raw data; determining, using the hash of the raw data, a first location in a hash map; inserting the encrypted version of the raw data to the first location in the hash map; determining to transmit, to another system, data for a second location in the hash map; selecting, using the second location, at least a subset of the data for the second location in the hash map; and transmitting, to the other system, the subset of the data for the second location in the hash map.

20 Claims, 3 Drawing Sheets

(56)        References Cited

U.S. PATENT DOCUMENTS

| | | | | |
|---|---|---|---|---|
| 2019/0356593 | A1* | 11/2019 | Nikolaidis | H04L 45/38 |
| 2020/0265163 | A1* | 8/2020 | Chakraborty | G06F 21/602 |

FOREIGN PATENT DOCUMENTS

| | | | | | | |
|---|---|---|---|---|---|---|
| CN | 117851345 | A | * | 4/2024 | | H04L 63/0428 |
| KR | 20220033109 | A | * | 3/2022 | | G06F 21/62 |
| WO | WO 2019/150175 | A1 | | 8/2019 | | |
| WO | WO-2023250215 | A1 | * | 12/2023 | | G06F 21/6227 |

OTHER PUBLICATIONS

Erlingsson et al., "Amplification by shuffling: from local to central differential privacy via anonymity," in Proceedings of the Thirtieth Annual ACM-SIAM Symposium on Discrete Algorithms (SODA' 19), USA: Society for Industrial and Applied Mathematics, San Diego, CA, USA, Jan. 6-9, 2019, 2468-2479.

Fanti et al., "Building a rappor with the unknown: Privacy preserving learning of associations and data dictionaries," Proceedings on Privacy Enhancing Technologies (PoPETS), Darmstadt, Germany, Jul. 19-22, 2016, 2016(3):41-61.

Korolova et al., "Releasing search queries and clicks privately," in Proceedings of the 18th International Conference on World Wide Web, Apr. 20-24, 2009, Madrid, Spain, 171-180.

Wang et al., "Privtrie: Effective frequent term discovery under local differential privacy," in Proceedings of 2018 IEEE 34th International Conference on Data Engineering (ICDE), Paris, France, Apr. 16-19, 2018, 821-832.

Extended European Search Report in European Appln. No. 25197352. 5, mailed on Dec. 8, 2025, 10 pages.

* cited by examiner

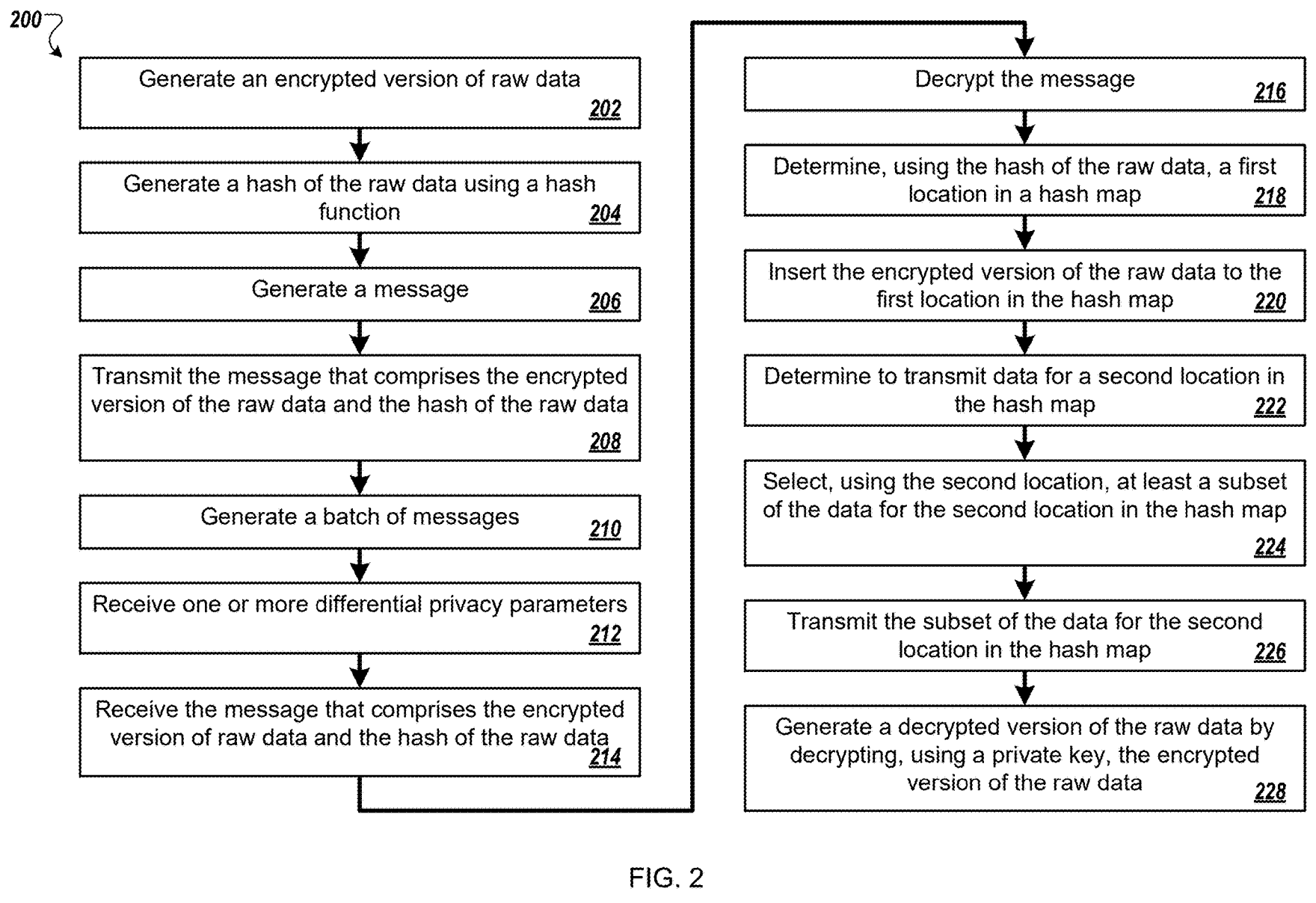

200

Generate an encrypted version of raw data  202

Generate a hash of the raw data using a hash function  204

Generate a message  206

Transmit the message that comprises the encrypted version of the raw data and the hash of the raw data  208

Generate a batch of messages  210

Receive one or more differential privacy parameters  212

Receive the message that comprises the encrypted version of raw data and the hash of the raw data  214

Decrypt the message  216

Determine, using the hash of the raw data, a first location in a hash map  218

Insert the encrypted version of the raw data to the first location in the hash map  220

Determine to transmit data for a second location in the hash map  222

Select, using the second location, at least a subset of the data for the second location in the hash map  224

Transmit the subset of the data for the second location in the hash map  226

Generate a decrypted version of the raw data by decrypting, using a private key, the encrypted version of the raw data  228

FIG. 2

ENHANCED RAW DATA SECURITY

BACKGROUND

Various systems can communicate over a network. For instance, a client device can send data to a server device, e.g., a cloud computing server. The data communicated over the network can be encrypted to increase data privacy, data security, or both.

SUMMARY

Some client devices can transmit data to a recipient processing system, e.g., a server or a cloud system, for analysis. Sending plain text data can have privacy concerns, security concerns, or both. For instance, a malicious actor might try to access the data before it is received by the recipient processing system. In some examples, the recipient processing system shouldn't be allowed access to data that is not anonymized, e.g., given user permissions or opt ins.

To increase data security, reduce communication cost, reduce computational costs, or any combination of these, the overall processing pipeline can include a client device, a shuffler system, an auxiliary system, and a data processing system. The auxiliary system can receive twice encoded messages indirectly from the client device, that were passed through the shuffler system. The auxiliary system can determine, using a hash of the plain text data, frequencies of the hashes. For instance, when the auxiliary system detects an instance of a hash, the auxiliary system can update a location in a hash map for the hash. This can include appending an encrypted version of the plain text data to the location in the hash map, which data is encrypted with a secret key for the system. In some examples, the hash map is a frequency map that indicates a frequency at which values with the corresponding hash were transmitted by the client devices.

Once the auxiliary system updates the hash map using multiple hashes, for multiple messages, the auxiliary system can select a subset of hash values for which to send data to the system. The multiple messages can be received from different client devices, a single client device, or a combination of both. The auxiliary system can select the hash values that have frequencies that satisfy a frequency threshold. The frequency threshold can require hash values that have a frequency greater than the threshold, e.g., for values that occur more frequently. In some examples, the frequency threshold can require hash values that have a frequency less than the threshold, e.g., for values that occur less frequently.

The system can receive the data from the auxiliary system and decrypt the encrypted data. The system can then process the decrypted data. Because of the use of the shuffler, neither the auxiliary system nor the system have access to data that indicates the source of the hashed values, the encrypted values, or the decrypted values. The use of the auxiliary system further reduces the amount of data processed by and communicated to the system, reducing computational resource usage.

The subject matter described in this specification can be implemented in various implementations and may result in one or more of the following advantages. In some implementations, the systems and methods described in this specification can improve data accuracy by encrypting the raw data in a message. For instance, this can provide more accurate data processing in environments in which the raw data can be from an unknown domain and segmenting the raw data into multiple domains, e.g., each having a domain size, would not satisfy an accuracy threshold, the unknown domain might not be recoverable using the hash of the raw data, or both. In some implementations, the systems and methods described in this specification can be more computationally efficient, e.g., use fewer processor cycles, less memory, or both, compared to other systems, e.g., that segment the raw data into multiple domains and reconstruct data. In some implementations, the systems and methods described in this specification can improve data privacy, data security, or both, by having an auxiliary system process a hash of the raw data and be unable to access the raw data itself, e.g., since the encryption of the raw data is using a key for which the auxiliary system does not have a corresponding decryption, e.g., private, key. In some implementations, the systems and methods described in this specification can provide differential privacy local-like privacy guarantees and accuracy comparable to central differential privacy, e.g., by using the encrypted raw data and hashed raw data. In some implementations, the systems and methods described in this specification can reduce computer resource usage, e.g., network bandwidth or computational costs such as processor and memory usage, by selecting a subset of data from a location in a hash map for transmission to another system.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2 is a flow diagram of an example process for transmitting a subset of data from a hash map.

Like reference numbers and designations in the various drawings indicate like elements.

DETAILED DESCRIPTION

Figure 1:
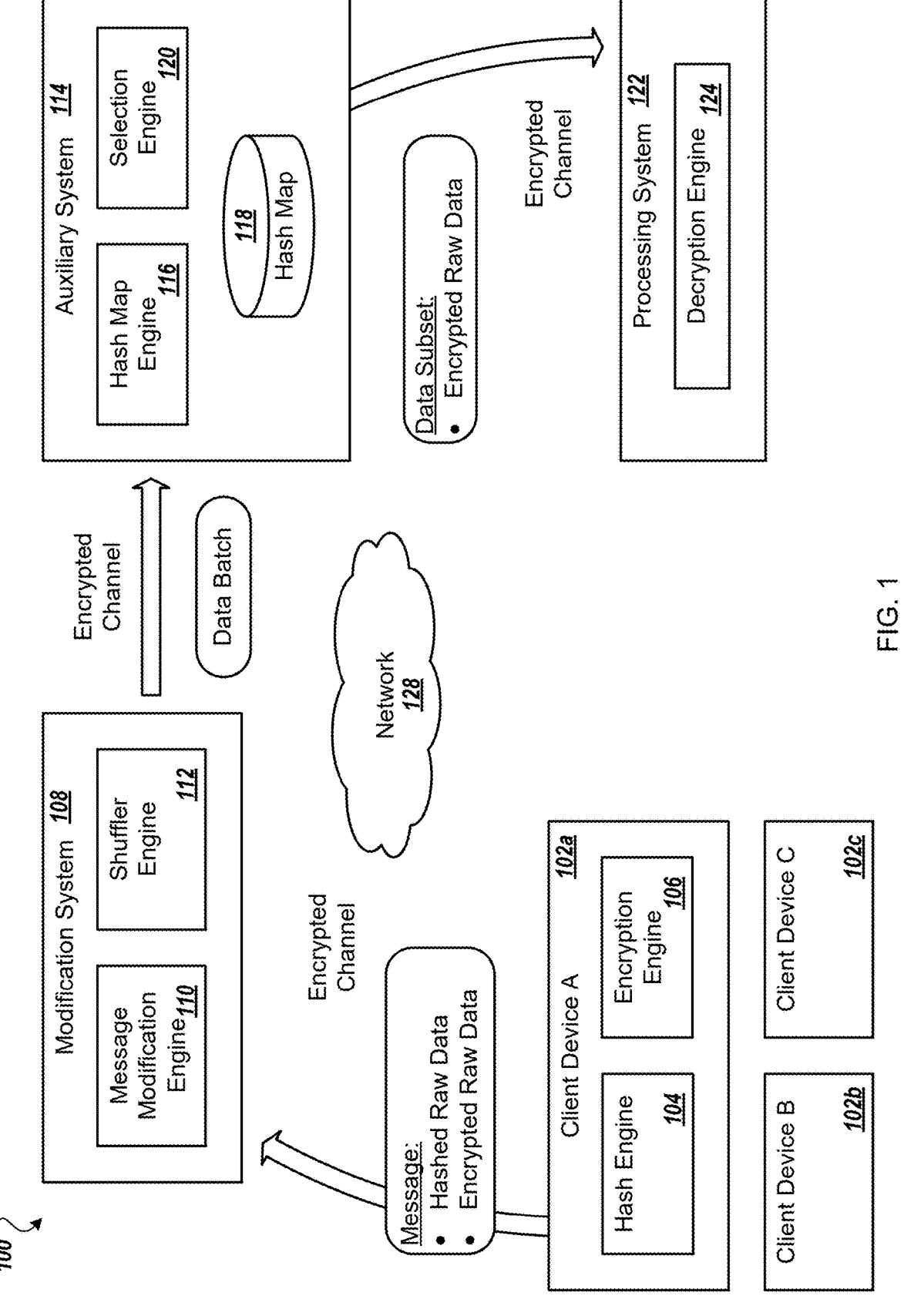
FIG. 1 depicts an example environment in which one or more client devices provide data to a processing system using differential privacy.

FIG. 1 depicts an example environment 100 in which one or more client devices 102*a-c* provide data to a processing system 122 using differential privacy. The client devices 102*a-c* can provide the data in the form of messages, either to a modification system 108 or an auxiliary system 114. When the auxiliary system 114 receives the data, the auxiliary system 114 performs one or more differential privacy operations to improve data security, privacy, or both, compared to other systems. The processing of the data by the auxiliary system 114 can reduce computer resource usage, e.g., by transmitting less data to a processing system 122, reducing analysis required by the processing system, or a combination of both.

The client devices 102*a-c* generate raw data, e.g., given applications executing on the devices, received input, communication with other devices, or any combination of these. The applications can be any appropriate type of application, such as a web application or a native application. Some examples of applications include document editing applications, social medial applications, and web browsers. Sometimes, some of that raw data can be analyzed by a downstream system, e.g., the processing system 122. This can occur when the downstream system processes the raw data to detect potential issues in an application and improve the performance of the application, to collaborate on data processing for an application, or for other appropriate processes.

Instead of sending the raw data, unprotected across a network 128, the client devices 102*a-c* perform one or more operations to secure the data. For instance, the client devices 102*a-c* can encrypt some of the raw data, generate a hash of some of the raw data, or a combination of both. Although some examples will refer generally to the client device A 102*a*, similar examples can apply to the other client devices B-C 102*b-c*.

The client device A 102*a* includes a hash engine 104. The hash engine 104 can use any appropriate hash function to generate a hash H of corresponding raw data $d_1$. The hashed result can be represented by $H[d_1]$. All of the client devices 102*a-c* can use the same hash function. In some examples, some of the client devices 102*a-c* might use a different hash function.

The client device A 102*a* includes an encryption engine 106. The encryption engine 106 can encrypt the raw data for transmission to the processing system 122. The encryption engine 106 can use any appropriate process for encrypting the message. For instance, for raw data $d_1$ and encryption key pk1, the client device A 102*a* can use the encryption engine 106 to generate an encrypted version of the raw data $E_{pk1}[d_1]$. The encryption key pk1 can be a public key for the processing system 122 for which the processing system 122 maintains a private decryption key to which only the processing system 122 properly has access.

In some examples, the encryption engine 106 can encrypt the hashed version of the raw data $H[d_1]$. The encryption engine 106 can use an encryption key pk2 for the auxiliary system 114, e.g., a public key. The auxiliary system 114 can maintain a corresponding private key to which only the auxiliary system 114 properly has access.

In some implementations, when encrypting the hashed version of the raw data $H[d_1]$, the encryption engine 106 can encrypt the encrypted version of the raw data $E_{pk1}[d_1]$. For instance, the encryption engine 106 can generate a message v that will be processed, at least in part, by the auxiliary system, e.g., $v=E_{pk2}[E_{pk1}[d_1] \oplus H[d_1]]$.

The client device A 102*a* can generate any remaining portion of the message v, e.g., a header. The remaining portions of the message can include identification information, such as a device identifier for the client device A 102*a*, an IP address, other appropriate source information, or any combination of these.

The client device A 102*a* transmits the message to a downstream system, e.g., the modification system 108 or the auxiliary system 114. The client device A 102*a* can use any appropriate process to transmit the message, e.g., any appropriate internet protocol.

The modification system 108 includes a message modification engine 110. The message modification engine 110 removes data from the received message, e.g., to increase data security, privacy, or both. For instance, the message modification engine 110 can generate a second message that includes the previous message, $v=E_{pk2}[E_{pk1}[d_1] \oplus H[d_1]]$, but without any data that is specific to the client device A 102*a* from which the message was received, e.g., without any device A 102*a* specific identification information. The message modification engine 110 can remove any device identifiers, header information, or other types of data that could potentially be used to associate the message v with the source client device A 102*a*. In some examples, the message modification engine 110 removes a header from the message v to generate the second message that only includes the data from the body of the message, e.g., $v=E_{pk2}[E_{pk1}[d_1] \oplus H[d_1]]$.

The modification system 108 can include a shuffler engine 112 that randomly shuffles the second messages. For example, the modification system 108 can receive n messages $\{v_1, \ldots, v_n\}$ from various client devices 102*a-c*. The modification system 108 can receive more than one message from some of the client devices 102*a-c*. The modification system 108 can receive a single message or no messages from some of the client devices 102*a-c*.

The shuffler engine 112 can, e.g., randomly, change the order in which the second messages are included in a data batch. For instance, as the modification system 108 receives messages, the modification system 108 can add the messages to a data batch, e.g., with a maximum size n, in an order in which the messages are received. When the modification system 108 determines that a transmission criterion is satisfied, e.g., a time criterion or the data batch includes the maximum size n of messages, the shuffler engine 112 changes the order in which the messages are included in the data batch to a second order $\pi\{v_1, \ldots, v_n\}$ that is different from the received in order. For example, the shuffler engine 112 can randomly change the order of two or more messages in the data batch, e.g., using any appropriate random permutation operations such as entry-by-entry brute force or Fisher-Yates.

In some examples, the modification system 108 can discard a message received from one of the client devices 102*a-c*. For instance, upon receiving a message from the client device A 102*a*, the modification system 108 can determine whether a number of messages received from the client device A 102*a* satisfies a message threshold, e.g., a maximum number of messages that can be received from any client device. If the threshold is not satisfied, the modification system 108 can process the message, e.g., using one or both of the message modification engine 110 or the shuffler engine 112.

If the threshold is satisfied, the modification system 108 can determine to skip processing the message. This can include deleting the data for the message from memory. By determining to skip processing the message, the modification system 108 can increase data security, e.g., reducing a likelihood that sensitive data for the client device A 102*a* might be inferred by the processing system 122. By determining to skip processing the message, the modification system 108 can reduce a likelihood of a data poisoning attack affecting any analysis by the processing system 122, e.g., destroying the aggregation in the data batch.

For any messages that the modification system 108 processes, the modification system 108 can maintain those messages in a data batch. The modification system 108 can provide a data batch to the auxiliary system 114. For instance, when the transmission criterion is satisfied, and the messages in the data batch are shuffled, the modification system 108 can transmit the shuffled messages in the data batch to the auxiliary system 114.

The auxiliary system 114 can receive a data batch from the modification system 108, e.g., a batch of messages, individual messages from the client devices 102*a-c*, or a combination of both. The auxiliary system 114 uses data from the received messages to update a hash map 118.

For instance, a hash map engine 116 included in the auxiliary system 114 can decrypt one or more of the received messages, e.g., when the messages are encrypted. The hash map engine 116 can use a private key, maintained at the auxiliary system 114, e.g., in memory, to decrypt the one or more of the received messages.

The hash map engine 116 can extract the hashed raw data $H[d_1]$ from the messages. The hash map engine 116 can use the hashed raw data as a key to the hash map 118, e.g., implemented in a database. For instance, the hash map engine 116 can update data at a location in the hash map that corresponds to the hashed raw data. The update can include updating a counter that indicates a number of instances of the particular hashed raw data $H[d_1]$ that the auxiliary system 114 has received, appending the corresponding encrypted raw data $E_{pk1}[d_1]$ to other data for the location in the hash map, or both.

The auxiliary system 114 can determine to transmit encrypted data to the processing system 122. The auxiliary system 114 can have any appropriate type of transmission criterion, such expiration of a time period, a frequency threshold, receipt of a request, or any combination of these.

Expiration of a time period can be determined using, e.g., a timer. The time period can be predefined, such as every hour, every day, or every month. The time period can be selected such that the auxiliary system 114 is likely to have a quantity of messages, e.g., generally or for a particular hash H[d], that satisfies a quantity threshold.

The frequency threshold can be any appropriate type of threshold. The threshold can be a minimum number of messages, or a maximum number of messages. For instance, the auxiliary system 114 can determine whether, for a particular hash H[d], the auxiliary system 114 has received at least the minimum number of messages. This determination can be for receipt of the minimum number of messages during a time period.

When the frequency threshold is a maximum number of messages, the auxiliary system 114 can determine to send data for a particular hash H[d] when the auxiliary system 114 has received fewer or at most the maximum number of messages that include the particular hash H[d]. The auxiliary system 114 can send encrypted data for messages that occur infrequently, e.g., given the maximum number of messages, in instances when software bugs or other data for analysis is less common and potentially identifiable because it is less common, e.g., to check for outliers.

In some instances, the auxiliary system 114 can receive a request for encrypted data, e.g., from the processing system 122. The request can be for particular encrypted data, e.g., and identify the particular hash. When the auxiliary system 114 receives a request for encrypted data, the auxiliary system 114 can determine whether one or more other transmission criteria are satisfied, e.g., if a corresponding frequency threshold is satisfied.

The auxiliary system 114 can maintain one or more differential privacy parameters. During an initialization process, the auxiliary system 114 can receive at least some of the differential privacy parameters, e.g., $\varepsilon$ or $\delta$, from the processing system 122. The auxiliary system 114 can then store the differential privacy parameters in memory, e.g., for later use.

The one or more differential privacy parameters can be any appropriate types of parameters. The auxiliary system 114 can use the differential privacy parameters to determine whether to transmit encrypted data to the processing system 122, which encrypted data to transmit, a degree of security for the encrypted data, or any combination of these. For instance, the one or more differential privacy parameters can include $\varepsilon$ or $\delta$. At least some of the differential privacy parameters can represent a degree of security for the messages that are transmitted from the auxiliary system 114 to the processing system 122. For instance, a smaller value of $\varepsilon$ can indicate a higher level of security, stronger privacy, or both, e.g., at a tradeoff of additional processing time. In some instances, the auxiliary system 114 can use a value of $\varepsilon$ that satisfies, e.g., is greater than or equal to, a threshold value, e.g., a large $\varepsilon$ value. When the auxiliary system 114 uses weights for one or more of the differential privacy parameters, the auxiliary system 114 can use a larger weight for $\varepsilon$. In some implementations, $\delta$ can represent a failure probability. $\delta$ can have a, e.g., fixed, value that is less than a threshold amount, e.g., a super small number such as a cryptographically small number.

Equations (1) and (2), below, can be used to compute some of the one or more differential privacy parameters $\varepsilon$ and $\delta$. In these equations, T can be a differential privacy threshold for the encrypted data. B can indicate a magnitude of added Laplace noise. The auxiliary system 114 can use the value of b to determine whether to transmit encrypted data to the processing system 122, what encrypted data to transmit to the processing system 122, or both, as described in more detail below. For instance, given a fixed value of b and a value of T, the auxiliary system can compute the differential privacy parameters $\varepsilon$ and $\delta$ using Equations (1) and (2). When the auxiliary system 114 has values for the differential privacy parameters $\varepsilon$ and $\delta$, the auxiliary system can use Equations (1) and (2) to compute b and T.

$$\varepsilon = \max\left\{\frac{1}{b}, \log\left(1 + \frac{1}{2e^{((T-1)/b)-1}}\right)\right\} \quad (1)$$

$$\delta = \frac{1}{2}\exp(\varepsilon(1-T)) \quad (2)$$

The auxiliary system 114 includes a selection engine 120. Upon a decision by the auxiliary system 114 to transmit encrypted data to the processing system 122, the selection engine 120 selects encrypted data for transmission. For instance, the selection engine 120 selects at least a subset of the data at the particular location H[d] in the hash map 118, e.g., a frequency map. In some examples, the subset is a proper subset of the data at the particular location H[d] in the hash map 118. The data at the particular location H[d] can be data connected using any appropriate data structure, e.g., a linked list or an array.

The selection engine 120 can use any appropriate data to select the encrypted data from the particular location H[d] for transmission to the processing system 122. For instance, the selection engine can use differential privacy techniques to select the encrypted data in the data subset. In some examples, the selection engine 120 can add Laplacian noise with a scale b to the frequency of the encrypted data. The selection engine 120 can add the Laplacian noise at the particular location of the hashed results H[d], e.g., to generate a noisy frequency. Addition of the Laplacian noise to the hash map can include setting b=1/$\varepsilon$, e.g., for which $\varepsilon$ is the desired privacy level.

The selection engine 120 can determine whether the noisy frequency satisfies a threshold, e.g., is greater than, equal to, or either, the threshold T. The threshold can be one of the transmission criteria, e.g., a frequency threshold, or a separate criterion. The threshold can be the differential privacy threshold T, e.g., computed using Equation (3), below. When the noisy frequency satisfies the threshold, the selection engine 120 can randomly select encrypted data from the particular location H[d] in the hash map, e.g., randomly sample corresponding encrypted data from the particular location H[d]. The selection engine 120 can use any appropriate random selection operations to randomly select the encrypted data.

$$T \geq 1 + \left( \frac{1}{\varepsilon} \log\left( \frac{1}{2\delta} \right) \right) \qquad (3)$$

The selection engine 114 can generate a data subset S for transmission to the processing system 122. For instance, during the random selection process, when the selection engine 114 selects encrypted data, e.g., encrypted raw data, from the hash map 118, the selection engine 114 can append the encrypted data onto the data subset S.

Table 1, below, includes example pseudo code for a differential privacy process performed by the auxiliary system 114.

TABLE 1

Auxiliary System Differential Privacy Process Pseudo Code

```
Input: a set of messages {v₁, . . ., vₙ} or shuffled messages π{v₁, . . ., vₙ};
T: Threshold for DP; b: scale of Laplacian noise
Output: encrypted message set S
Operations:
  Initiate hash map F and release set S;
  Optionally decrypt each message in {v₁, . . ., vₙ};
  Obtain Arr = { E_{pk1}[d₁] ⊕ H[d₁], . . ., E_{pk1}[dₙ] ⊕ H[dₙ] };
  For E_{pk1}[d], H[d] in Arr do
    If H[d] in F then
       F[H[d]].append(E_{pk1}[d]);
    Else
       F[H[d]] = [E_{pk1}[d]];
    End if
  End for
  For key in F do
    If len(F[key]) + Lap(b) ≥ T then
       Randomly select E_{pk1}[d] from F[key];
       Add E_{pk1}[d] to S;
    End if
  End for
  Return S
```

The auxiliary system 114 transmits the encrypted dataset S to the processing system 122. In implementations that include the modification system 108, because the auxiliary system 114 receives the data batch from the modification system 108, neither the auxiliary system 114 nor the processing system 122 have access to identification information included in the messages transmitted directly from the client devices 102a-c to the modification system.

The processing system 122 receives the encrypted dataset S from the auxiliary system 114. A decryption engine 124, included in the processing system 122, can decrypt the encrypted data to extract the raw data, e.g., d₁, . . . , dₘ. The processing system 122 can then perform one or more operations on the raw data, such as computing analytics for the raw data, generating instructions that cause presentation of the raw data, the corresponding analysis, or both, or perform another appropriate action.

The processing system 122 does not have access to identifying information that might correlate the encrypted data with the client device that generated the encrypted data. Since the processing system 122 receives the encrypted data from the auxiliary system 114, which data was optionally processed by the modification system 108, the processing system 122 does not have identifying information for the raw data.

In implementations in which the types of raw data, the domain of the raw data, or both, are unknown, by receiving an encrypted version of the raw data that was processed by the auxiliary system 114, the processing system 122 can perform more accurate operations using the raw data compared to other systems, e.g., that might receive only a hashed version of the raw data.

Since the processing system 122 receives only subsets of some hashed values H[d], the processing system 122 uses fewer computational resources compared to other systems. For instance, the processing system 122 need not use computational cycles, memory, or both, to process data that does not satisfy any of the transmission criterion.

The modification system 108, the auxiliary system 114, and the processing system 122 are each examples of a system implemented as computer programs on one or more computers in one or more locations, in which the systems, components, and techniques described in this specification are implemented. The client devices 102a-c can include personal computers, mobile communication devices, and other devices that can send and receive data over a network 128. The network 128, such as a local area network ("LAN"), wide area network ("WAN"), the Internet, or a combination thereof, connects the client devices 102a-c, the modification system 108, the auxiliary system 114, and the processing system 122. Any one or more of the modification system 108, the auxiliary system 114, and the processing system 122 can use a single computer or multiple computers operating in conjunction with one another, including, for example, a set of remote computers deployed as a cloud computing service.

The modification system 108, the auxiliary system 114, and the processing system 122 can include several different functional components, including the message modification engine 110, the shuffler engine 112, the hash map engine 116, the selection engine 120, the hash map 118, and the decryption engine 124. The message modification engine 110, the shuffler engine 112, the hash map engine 116, the selection engine 120, the hash map 118, the decryption engine 124, or a combination of these, can include one or more data processing apparatuses, can be implemented in code, or a combination of both. For instance, each of the message modification engine 110, the shuffler engine 112, the hash map engine 116, the selection engine 120, the hash map 118, and the decryption engine 124 can include one or more data processors and instructions that cause the one or more data processors to perform the operations discussed herein.

The various functional components of the modification system 108, the auxiliary system 114, and the processing system 122 can be installed on one or more computers as separate functional components or as different modules of a same functional component. For example, any combination of the components of the modification system 108, the auxiliary system 114, and the processing system 122 can be implemented as computer programs installed on one or more computers in one or more locations that are coupled to each through a network. In cloud-based systems for example, these components can be implemented by individual computing nodes of a distributed computing system.

FIG. 2 is a flow diagram of an example process 200 for transmitting a subset of data from a hash map. For example, the process 200 can be used by any appropriate combination of the client devices 102a-c, the modification system 108, the auxiliary system 114, and the processing system 122 from the environment 100.

A client device generates an encrypted version of raw data by encrypting, by a client device and using a first public key for another system, the raw data (202). The first public key can be for a downstream system, e.g., a processing system. The raw data can be any appropriate data. In some examples, the raw data can have an unknown domain, e.g., not be limited to any particular domain.

In some implementations, the raw data can be data generated by an application executing on the respective client device, e.g., a social media application. The raw data can represent a search string, a uniform resource identifier ("URI"), a website, a news article, or other appropriate types of data for an application on the client device.

The client device generates a hash of the raw data using a hash function (204). The client device can use any appropriate type of hash function. In environments in which multiple client devices are separately hashing different raw data, each of the client devices uses the same hash function to generate a hash of corresponding raw data.

The client device generates a message (206). The message includes the encrypted raw data and the hashed raw data.

In some examples, the client device can encrypt the message. For instance, the client device can encrypt, using a second public key for an auxiliary system, a combination of the encrypted version of the raw data and the hash of the raw data. The client device can use any appropriate encryption process using the second public key.

The client device transmits the message that comprises the encrypted version of the raw data and the hash of the raw data (208). The client device can use any appropriate protocol to transmit the message, e.g., the encrypted message.

A modification system generates a batch of messages (210). For instance, the modification system can receive the message from the client device. The modification system can perform one or more operations described above, e.g., removal of identification data, random shuffling, discarding messages that will not be included in the batch, or any appropriate combination of these. After generating the batch of messages, the modification system can transmit the batch of messages to the auxiliary system using any appropriate protocol.

An auxiliary system receives one or more differential privacy parameters (212). For example, the auxiliary system can communicate with the processing system to agree upon the one or more differential privacy parameters.

The auxiliary system receives the message that comprises the encrypted version of raw data and the hash of the raw data (214). The auxiliary system can receive the message from the client device, or as one message in the batch of messages from the modification system.

The auxiliary system decrypts the message (216). For instance, when the message is encrypted using a second public key for the auxiliary system, the auxiliary system can decrypt the message. This can occur whether the message is received from the client device or the modification system.

In implementations that do not include a separate modification system, the auxiliary system can perform one or more anonymization processes. For instance, the auxiliary system can perform at least some of the operations that are described above with reference to the modification system, e.g., the modification system can be implemented on the auxiliary system.

The auxiliary system determines, using the hash of the raw data, a first location in a hash map (218). For example, the auxiliary system uses the hash of the raw data, that was extracted from the message, as a key to the hash map of the input data. The hash is less accurate than the original raw data itself since the hash function can receive as input a larger number of input vales, e.g., from an unknown domain, and outputs a smaller, more limited number of output values.

Since the hash function is irreversible, e.g., multiple inputs map to the same output, the auxiliary system is unable to determine the raw data given access to the hash of the raw data, e.g., resulting in improved data privacy, data security, or both.

The auxiliary system inserts the encrypted version of the raw data to the first location in the hash map (220). The insertion of the encrypted version of the raw data at the first location can indicate a number of times that the corresponding location was identified in a message. When the hash map has one hundred locations, the fifteenth location can indicate a number of times that fifteenth location was identified in a message received from any of the client devices, e.g., not accounting for any messages discarded by the modification system. For instance, when a value at the fifteenth location is sixty-five, that indicates that sixty-five messages were received from any combination of client devices and that included a hash of raw data H[d] that maps to that sixty-fifth location.

The auxiliary system determines to transmit data for a second location in the hash map (222). This determination can be based on any appropriate combination of transmission criteria, such as a frequency threshold, a request, or expiration of a time period.

When using a frequency threshold, the auxiliary system can determine whether a frequency for the second location, in the hash map, satisfies the frequency threshold. In response to determining that the frequency for the second location satisfies the frequency threshold, the auxiliary system can determine to transmit the data for the second location to another system, e.g., the processing system. In these implementations, the hash map can include a counter that indicates a number of encrypted versions of raw data maintained at the second location in the hash map. In some examples, as part of this determination, the auxiliary system can determine whether a combination of a) the number of encrypted versions of raw data at the second location in the hash map, and b) a Laplacian value satisfies the frequency threshold.

When receiving a request, the auxiliary system can receive a request that includes a hash. The auxiliary system can determine the second location in the hash map using the hash from the request. The auxiliary system can receive the request from the processing system or another appropriate system.

The auxiliary system selects, using the second location, at least a subset of the data for the second location in the hash map (224). For instance, the auxiliary system can randomly select encrypted raw data from the second location. The random selection can use any appropriate random selection process. The selected data can include a proper subset of the data at the second location or all of the data at the second location.

The auxiliary system transmits the subset of the data for the second location in the hash map (226). The auxiliary system can use any appropriate protocol to transmit the subset of the data to the processing system.

A processing system generates a decrypted version of the raw data by decrypting, using a private key, the encrypted version of the raw data (228). For instance, the processing system receives the subset of the data and uses its private key to decrypt the encrypted data in the subset. The processing system can perform one or more actions on the decrypted raw data, e.g., as described in more detail above.

The order of operations in the process 200 described above is illustrative only, and the transmission of the subset of data from the hash map can be performed in different orders. For example, the process 200 can generate the hash of the raw data and then generate the encrypted version of the raw data. The process 200 can receive the message, e.g. perform operation 214 or decrypt the message, e.g. operation 216, and then receive the one or more differential privacy parameters, e.g., perform operation 212.

In some implementations, the process 200 can include additional operations, fewer operations, or some of the operations can be divided into multiple operations. For example, the process 200 can include operations 214, 218, 220, 222, 224, and 226 without the other operations in the process 200. In some examples, the process 200 can optionally include operation 228, 210, or both, e.g., in addition to operations 214, 218, 220, 222, 224, and 226. In some instances, the process 200 can include one or more of operations 202, 204, 206, or 208.

In some implementations, the client device might execute a social media application, e.g., a native application or by accessing a web site. The client device and the processing system can collaborate on data processing when the client device provides data to the processing system. By using one or more processes described in this specification, the client device can provide data, e.g., data records, to the processing system without sharing particular user data that is associated with a corresponding user.

For situations in which the systems discussed here collect personal information about people, or may make use of personal information, the people may be provided with an opportunity to control whether programs or features collect personal information (e.g., information about a person's activities, a person's preferences, or a person's current location), or to control whether and/or how the system operates. In addition, certain data may be anonymized in one or more ways before it is stored or used, so that personally identifiable information is removed. For example, a person's identity may be anonymized so that no personally identifiable information can be determined for the person, or a person's geographic location may be generalized where location information is obtained (such as to a city, ZIP code, or state level), so that a particular location of a person cannot be determined. Thus, the person may have control over how information is collected about him or her and used.

In this specification, the term "database" is used broadly to refer to any collection of data: the data does not need to be structured in any particular way, or structured at all, and it can be stored on storage devices in one or more locations. A database can be implemented on any appropriate type of memory.

In this specification the term "engine" is used broadly to refer to a software-based system, subsystem, or process that is programmed to perform one or more specific functions. Generally, an engine will be implemented as one or more software modules or components, installed on one or more computers in one or more locations. In some instances, one or more computers will be dedicated to a particular engine. In some instances, multiple engines can be installed and running on the same computer or computers.

In this specification, the term "likely" is used to mean that there is a likelihood that something might occur and that likelihood satisfies a likelihood threshold. For instance, when determining that a database, e.g., a hash map or other database, is likely to have a number of messages, a system would determine a likelihood that the database will have the number of messages given a duration of a time period. The system would then determine whether the likelihood satisfies, e.g., is greater than or equal to, a likelihood threshold by comparing the two values. If so, the system determines that the database will likely have the number of messages by the end of the time period. If not, the system determines that the database will not likely have the number of messages by the end of the time period.

This specification uses the term "configured to" in connection with systems, apparatus, and computer program components. That a system of one or more computers is configured to perform particular operations or actions means that the system has installed on it software, firmware, hardware, or a combination of them that in operation cause the system to perform those operations or actions. That one or more computer programs is configured to perform particular operations or actions means that the one or more programs include instructions that, when executed by data processing apparatus, cause the apparatus to perform those operations or actions. That special-purpose logic circuitry is configured to perform particular operations or actions means that the circuitry has electronic logic that performs those operations or actions.

A number of implementations have been described. Nevertheless, it will be understood that various modifications can be made without departing from the spirit and scope of the disclosure. For example, various forms of the flows shown above can be used, with operations re-ordered, added, or removed.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible non-transitory program carrier for execution by, or to control the operation of, a data processing apparatus. Alternatively, or in addition, the program instructions can be encoded on an artificially-generated propagated signal, e.g., a machine-generated electrical, optical, or electromagnetic signal, that is generated to encode information for transmission to a suitable receiver apparatus for execution by a data processing apparatus. One or more computer storage media can include a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can be or include special purpose logic circuitry, e.g., a field programmable gate array ("FPGA") or an application-specific integrated circuit ("ASIC"). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can be performed by, and apparatus can also be implemented as, special purpose logic circuitry, e.g., a field programmable gate array ("FPGA") or an application-specific integrated circuit ("ASIC").

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. A computer can be embedded in another device, e.g., a mobile telephone, a smart phone, a headset, a personal digital assistant ("PDA"), a mobile audio or video player, a game console, a Global Positioning System ("GPS") receiver, or a portable storage device, e.g., a universal serial bus ("USB") flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a liquid crystal display ("LCD"), an organic light emitting diode ("OLED") or other monitor, for displaying information to the user and a keyboard and a pointing device, e.g., a mouse or a trackball or a touchscreen, by which the user can provide input to the computer. Other kinds of devices can be used to provide for interaction with a user as well. For example, feedback provided to the user can be any form of sensory feedback, e.g., visual feedback, auditory feedback, or tactile feedback; and input from the user can be received in any form, including acoustic, speech, or tactile input. In some examples, a computer can interact with a user by sending documents to and receiving documents from a device that is used by the user; for example, by sending web pages to a web browser on a user's device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, e.g., an Hypertext Markup Language ("HTML") page, to a user device, e.g., for purposes of displaying data to and receiving user input from a user device, which acts as a client. Data generated at the user device, e.g., a result of user interaction with the user device, can be received from the user device at the server.

Figure 3:
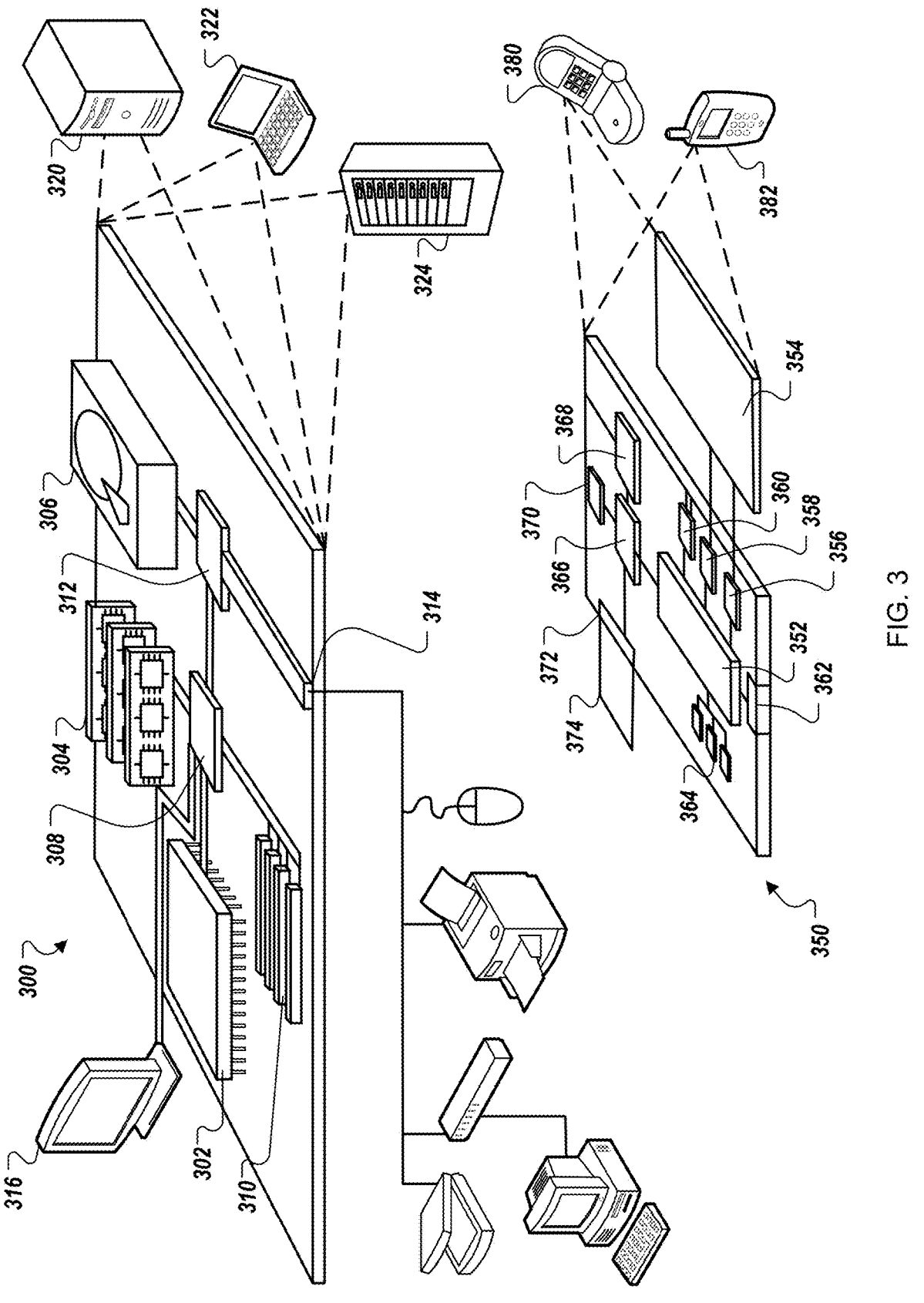
FIG. 3 is a block diagram of a computing system that can be used in connection with computer-implemented methods described in this specification.

FIG. 3 is a block diagram of computing devices 300, 350 that may be used to implement the systems and methods described in this specification, as either a client or as a server or plurality of servers. Computing device 300 is intended to represent various forms of digital computers, such as laptops, desktops, workstations, personal digital assistants, servers, blade servers, mainframes, and other appropriate computers. Computing device 350 is intended to represent various forms of mobile devices, such as personal digital assistants, cellular telephones, smartphones, smartwatches, head-worn devices, and other similar computing devices. The components shown here, their connections and relationships, and their functions, are meant to be exemplary only, and are not meant to limit implementations described and/or claimed in this specification.

Computing device 300 includes a processor 302, memory 304, a storage device 306, a high-speed interface 308 connecting to memory 304 and high-speed expansion ports 310, and a low speed interface 312 connecting to low speed bus 314 and storage device 306. Each of the components 302, 304, 306, 308, 310, and 312, are interconnected using various busses, and may be mounted on a common motherboard or in other manners as appropriate. The processor 302 can process instructions for execution within the computing device 300, including instructions stored in the memory 304 or on the storage device 306 to display graphical information for a GUI on an external input/output device, such as display 316 coupled to high speed interface 308. In other implementations, multiple processors and/or multiple buses may be used, as appropriate, along with multiple memories and types of memory. Also, multiple computing devices 300 may be connected, with each device providing portions of the necessary operations (e.g., as a server bank, a group of blade servers, or a multi-processor system).

The memory 304 stores information within the computing device 300. In one implementation, the memory 304 is a computer-readable medium. In one implementation, the memory 304 is a volatile memory unit or units. In another implementation, the memory 304 is a non-volatile memory unit or units.

The storage device 306 is capable of providing mass storage for the computing device 300. In one implementation, the storage device 306 is a computer-readable medium. In various different implementations, the storage device 306 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 304, the storage device 306, or memory on processor 302.

The high-speed controller 308 manages bandwidth-intensive operations for the computing device 300, while the low-speed controller 312 manages lower bandwidth-intensive operations. Such allocation of duties is exemplary only. In one implementation, the high-speed controller 308 is coupled to memory 304, display 316 (e.g., through a graphics processor or accelerator), and to high-speed expansion ports 310, which may accept various expansion cards (not shown). In the implementation, low-speed controller 312 is coupled to storage device 306 and low-speed expansion port 314. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 300 may be implemented in a number of different forms, as shown in the figure. For example, it may be implemented as a standard server 320, or multiple times in a group of such servers. It may also be implemented as part of a rack server system 324. In addition, it may be implemented in a personal computer such as a laptop computer 322. Alternatively, components from computing device 300 may be combined with other components in a mobile device (not shown), such as device 350. Each of such devices may contain one or more of computing device 300, 350, and an entire system may be made up of multiple computing devices 300, 350 communicating with each other.

Computing device 350 includes a processor 352, memory 364, an input/output device such as a display 354, a communication interface 366, and a transceiver 368, among other components. The device 350 may also be provided with a storage device, such as a microdrive or other device, to provide additional storage. Each of the components 350, 352, 364, 354, 366, and 368, are interconnected using various buses, and several of the components may be mounted on a common motherboard or in other manners as appropriate.

The processor 352 can process instructions for execution within the computing device 350, including instructions stored in the memory 364. The processor may also include separate analog and digital processors. The processor may provide, for example, for coordination of the other components of the device 350, such as control of user interfaces, applications run by device 350, and wireless communication by device 350.

Processor 352 may communicate with a user through control interface 358 and display interface 356 coupled to a display 354. The display 354 may be, for example, a TFT LCD display or an OLED display, or other appropriate display technology. The display interface 356 may comprise appropriate circuitry for driving the display 354 to present graphical and other information to a user. The control interface 358 may receive commands from a user and convert them for submission to the processor 352. In addition, an external interface 362 may be provided in communication with processor 352, so as to enable near area communication of device 350 with other devices. External interface 362 may provide, for example, for wired communication (e.g., via a docking procedure) or for wireless communication (e.g., via Bluetooth or other such technologies).

The memory 364 stores information within the computing device 350. In one implementation, the memory 364 is a computer-readable medium. In one implementation, the memory 364 is a volatile memory unit or units. In another implementation, the memory 364 is a non-volatile memory unit or units. Expansion memory 374 may also be provided and connected to device 350 through expansion interface 372, which may include, for example, a SIMM card interface. Such expansion memory 374 may provide extra storage space for device 350, or may also store applications or other information for device 350. Specifically, expansion memory 374 may include instructions to carry out or supplement the processes described above, and may include secure information also. Thus, for example, expansion memory 374 may be provided as a security module for device 350, and may be programmed with instructions that permit secure use of device 350. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 364, expansion memory 374, or memory on processor 352.

Device 350 may communicate wirelessly through communication interface 366, which may include digital signal processing circuitry where necessary. Communication interface 366 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 368. In addition, short-range communication may occur, such as using a Bluetooth, WiFi, or other such transceiver (not shown). In addition, GPS receiver module 370 may provide additional wireless data to device 350, which may be used as appropriate by applications running on device 350.

Device 350 may also communicate audibly using audio codec 360, which may receive spoken information from a user and convert it to usable digital information. Audio codec 360 may likewise generate audible sound for a user, such as through a speaker, e.g., in a handset of device 350. Such sound may include sound from voice telephone calls, may include recorded sound (e.g., voice messages, music files, etc.) and may also include sound generated by applications operating on device 350.

The computing device 350 may be implemented in a number of different forms, as shown in the figure. For example, it may be implemented as a cellular telephone 380.

It may also be implemented as part of a smartphone 382, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

In addition to the embodiments of the attached claims and the embodiments described above, the following numbered embodiments are also innovative.

Embodiment 1 is a method comprising receiving, by a system, a message that comprises an encrypted version of raw data and a hash of the raw data; determining, using the hash of the raw data, a first location in a hash map; inserting the encrypted version of the raw data to the first location in the hash map; determining to transmit, to another system, data for a second location in the hash map; selecting, using the second location, at least a subset of the data for the second location in the hash map; and transmitting, to the other system, the subset of the data for the second location in the hash map.

Embodiment 1 may provide one or more of the following technical advantages or effects: improved data accuracy, improved data privacy, improved data security, increased computational efficiency, or any combination of these.

Embodiment 2 is the method of embodiment 1, wherein: selecting at least the subset of the data for the second location comprises randomly selecting one or more encrypted versions of raw data from the second location in the hash map; and transmitting the subset of the data comprises transmitting the one or more encrypted versions of raw data that were randomly selected from the second location in the hash map.

Embodiment 2 may provide one or more of the following technical advantages or effects: improved data privacy, improved data security, or both.

Embodiment 3 is the method of embodiment 2, wherein: the one or more encrypted versions of raw data from the second location comprise a proper subset of encrypted versions of raw data from the second location in the hash map.

Embodiment 3 may provide one or more of the following technical advantages or effects: improved data privacy, improved data security, or both.

Embodiment 4 is the method of embodiment 1, wherein: determining to transmit the data for the second location comprises: determining whether a frequency for the second location satisfies a frequency threshold; and in response to determining that the frequency for the second location satisfies the frequency threshold, determining to transmit the data for the second location to the other system.

Embodiment 4 may provide one or more of the following technical advantages or effects: improved data privacy, improved data security, or both.

Embodiment 5 is the method of embodiment 4, wherein: determining whether the frequency for the second location satisfies the frequency threshold comprises determining whether a combination of a) a number of second encrypted versions of second raw data at the second location in the hash map, and b) a Laplacian value satisfies the frequency threshold.

Embodiment 6 is the method of embodiment 5, comprising determining the Laplacian value using one or more differential privacy parameters.

Embodiment 7 is the method of embodiment 6, comprising receiving, from the other system and prior to determining to transmit the data for the second location to the other system, the one or more differential privacy parameters.

Embodiment 8 is the method of embodiment 1, wherein: determining to transmit the data for the second location comprises receiving, from the other system, an identifier for the second location.

Embodiment 9 is the method of embodiment 8, wherein: the identifier for the second location comprises the hash.

Embodiment 10 is the method of embodiment 1, wherein: receiving the message comprises: receiving, from one or more modification computers, a batch of second messages that a) each include a corresponding second encrypted version of corresponding second raw data and a corresponding second hash of the corresponding second raw data and b) were randomly shuffled to create a shuffled order different than an order in which the messages were generated by a corresponding client device or received by a computer from the one or more modification computers.

Embodiment 10 may provide one or more of the following technical advantages or effects: improved data privacy, improved data security, or both.

Embodiment 11 is the method of embodiment 1, wherein: receiving the message comprises: receiving, from one or more modification computers, a batch of second messages a) that each include a corresponding second encrypted version of corresponding second raw data and a corresponding second hash of the corresponding second raw data and b) from which the one or more modification computers removed device specific data from a source device field.

Embodiment 11 may provide one or more of the following technical advantages or effects: improved data privacy, improved data security, or both.

Embodiment 12 is the method of embodiment 1, comprising: generating the encrypted version of the raw data by encrypting, by a client device and using a first public key for the other system, the raw data; generating the hash of the raw data using a hash function; and transmitting, to the system, the message that comprises the encrypted version of the raw data and the hash of the raw data.

Embodiment 12 may provide one or more of the following technical advantages or effects: improved data accuracy, improved data privacy, improved data security, increased computational efficiency, or any combination of these.

Embodiment 13 is the method of embodiment 12, comprising: generating, by the client device, the message by encrypting, using a second public key for the system, a combination of the encrypted version of the raw data and the hash of the raw data; and decrypting, by the system and after receiving the message and using a private key for the system, the message to extract the encrypted version of the raw data and the hash of the raw data, wherein: determining the first location in the hash map uses the extracted hash of the raw data; and inserting the encrypted version of the raw data to the first location in the hash map uses the extracted encrypted version of the raw data.

Embodiment 14 is the method of embodiment 12, comprising: receiving, by the other system, the subset of the data for the second location in the hash map that includes the encrypted version of the raw data; generating a decrypted version of the raw data by decrypting, using a private key for the other system, the encrypted version of the raw data; and processing the decrypted version of the raw data.

Embodiment 15 is a system comprising: one or more computers and one or more storage devices storing instructions that are operable, when executed by the one or more computers, to cause the one or more computers to perform the method of any one of embodiments 1 to 14.

Embodiment 16 is a computer program carrier encoded with a computer program, the program comprising instructions that are operable, when executed by one or more computers, to cause the one or more computers to perform the method of any one of embodiments 1 to 14.

Embodiment 17 is the computer program carrier of embodiment 16, wherein the computer program carrier is a propagated, e.g., non-transitory, signal.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some instances be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures, such as spreadsheets, relational databases, or structured files, may be used.

Particular implementations of the invention have been described. Other implementations are within the scope of the following claims. For example, the operations recited in the claims, described in the specification, or depicted in the figures can be performed in a different order and still achieve desirable results. In some implementations, multitasking and parallel processing may be advantageous.

What is claimed is:

1. A computer-implemented method comprising:
   receiving, by a system, a message that comprises an encrypted version of raw data and a hash of the raw data;
   determining, using the hash of the raw data, a first location in a hash map that maintains, for each of two or more locations in the hash map, encrypted data at the location to which a hash that corresponds to the encrypted data maps, the two or more locations including the first location and a second location;
   inserting the encrypted version of the raw data to the first location in the hash map;
   determining to transmit, to another system, at least some of the data from the second location in the hash map;
   selecting, using the second location, at least a subset of the data from the second location in the hash map; and
   transmitting, to the other system, the subset of the data from the second location in the hash map.

2. The method of claim 1, wherein:
   selecting at least the subset of the data from the second location comprises randomly selecting one or more encrypted versions of raw data from the second location in the hash map; and
   transmitting the subset of the data comprises transmitting the one or more encrypted versions of raw data that were randomly selected from the second location in the hash map.

3. The method of claim 2, wherein the one or more encrypted versions of raw data from the second location comprise a proper subset of encrypted versions of raw data from the second location in the hash map.

4. The method of claim 1, wherein determining to transmit the data from the second location comprises:
   determining whether a frequency for the second location satisfies a frequency threshold; and
   in response to determining that the frequency for the second location satisfies the frequency threshold, determining to transmit the data from the second location to the other system.

5. The method of claim 4, wherein determining whether the frequency for the second location satisfies the frequency threshold comprises determining whether a combination of a) a number of second encrypted versions of second raw data at the second location in the hash map, and b) a Laplacian value satisfies the frequency threshold.

6. The method of claim 5, comprises determining the Laplacian value using one or more differential privacy parameters.

7. The method of claim 6, comprising receiving, from the other system and prior to determining to transmit the data from the second location to the other system, the one or more differential privacy parameters.

8. The method of claim 1, wherein determining to transmit the data from the second location comprises receiving, from the other system, an identifier for the second location.

9. The method of claim 8, wherein the identifier for the second location comprises the hash.

10. The method of claim 1, wherein receiving the message comprises:

receiving, from one or more modification computers, a batch of second messages that a) each include a corresponding second encrypted version of corresponding second raw data and a corresponding second hash of the corresponding second raw data and b) were randomly shuffled to create a shuffled order different than an order in which the messages were generated by a corresponding client device or received by a computer from the one or more modification computers.

11. The method of claim 1, wherein receiving the message comprises:

receiving, from one or more modification computers, a batch of second messages a) that each include a corresponding second encrypted version of corresponding second raw data and a corresponding second hash of the corresponding second raw data and b) from which the one or more modification computers removed device specific data from a source device field.

12. The method of claim 1, comprising:

generating the encrypted version of the raw data by encrypting, by a client device and using a first public key for the other system, the raw data;

generating the hash of the raw data using a hash function; and transmitting, to the system, the message that comprises the encrypted version of the raw data and the hash of the raw data.

13. The method of claim 12, comprising:

generating, by the client device, the message by encrypting, using a second public key for the system, a combination of the encrypted version of the raw data and the hash of the raw data; and decrypting, by the system and after receiving the message and using a private key for the system, the message to extract the encrypted version of the raw data and the hash of the raw data, wherein:

determining the first location in the hash map uses the extracted hash of the raw data; and inserting the encrypted version of the raw data to the first location in the hash map uses the extracted encrypted version of the raw data.

14. The method of claim 12, comprising:

receiving, by the other system, the subset of the data for the second location in the hash map that includes the encrypted version of the raw data;

generating a decrypted version of the raw data by decrypting, using a private key for the other system, the encrypted version of the raw data; and processing the decrypted version of the raw data.

15. A system comprising one or more computers and one or more storage devices on which are stored instructions that are operable, when executed by the one or more computers, to cause the one or more computers to perform operations comprising:

receiving, by a system, a message that comprises an encrypted version of raw data and a hash of the raw data;

determining, using the hash of the raw data, a first location in a hash map that maintains, for each of two or more locations in the hash map, encrypted data at the location to which a hash that corresponds to the encrypted data maps, the two or more locations including the first location and a second location;

inserting the encrypted version of the raw data to the first location in the hash map;

determining to transmit, to another system, at least some of the data from the second location in the hash map;

selecting, using the second location, at least a subset of the data from the second location in the hash map; and transmitting, to the other system, the subset of the data from the second location in the hash map.

16. The system of claim 15, wherein:

selecting at least the subset of the data from the second location comprises randomly selecting one or more encrypted versions of raw data from the second location in the hash map; and transmitting the subset of the data comprises transmitting the one or more encrypted versions of raw data that were randomly selected from the second location in the hash map.

17. The system of claim 16, wherein the one or more encrypted versions of raw data from the second location comprise a proper subset of encrypted versions of raw data from the second location in the hash map.

18. The system of claim 15, wherein determining to transmit the data from the second location comprises:

determining whether a frequency for the second location satisfies a frequency threshold; and in response to determining that the frequency for the second location satisfies the frequency threshold, determining to transmit the data from the second location to the other system.

19. The system of claim 18, wherein determining whether the frequency for the second location satisfies the frequency threshold comprises determining whether a combination of a) a number of second encrypted versions of second raw data at the second location in the hash map, and b) a Laplacian value satisfies the frequency threshold.

20. One or more non-transitory computer storage media encoded with instructions that, when executed by one or more computers, cause the one or more computers to perform operations comprising:

receiving, by a system, a message that comprises an encrypted version of raw data and a hash of the raw data;

determining, using the hash of the raw data, a first location in a hash map that maintains, for each of two or more locations in the hash map, encrypted data at the location to which a hash that corresponds to the encrypted data maps, the two or more locations including the first location and a second location;

inserting the encrypted version of the raw data to the first location in the hash map;

determining to transmit, to another system, at least some of the data from the second location in the hash map;

selecting, using the second location, at least a subset of the data from the second location in the hash map; and transmitting, to the other system, the subset of the data from the second location in the hash map.

* * * * *